(12) United States Patent
Kabadagi et al.

(10) Patent No.: US 12,533,814 B2
(45) Date of Patent: Jan. 27, 2026

(54) APPARATUS AND METHOD FOR AUTOMATIC CALIBRATION OF A ROBOTIC ARM IN A MODULAR SYSTEM

(71) Applicant: Pramana, Inc., Cambridge, MA (US)

(72) Inventors: Omkar Appasaheb Kabadagi, Bangalore (IN); Mohammad Abdul Sulaiman, Visakhapatnam (IN); Rameesh Varshan, Chennai (IN)

(73) Assignee: Pramana, Inc., Cambridge, MA (US)

( * ) Notice: Subject to any disclaimer, the term of this patent is extended or adjusted under 35 U.S.C. 154(b) by 0 days.

(21) Appl. No.: 18/754,599

(22) Filed: Jun. 26, 2024

(65) Prior Publication Data
US 2026/0001231 A1    Jan. 1, 2026

(51) Int. Cl.
*B25J 9/16* (2006.01)

(52) U.S. Cl.
CPC .......... *B25J 9/1692* (2013.01); *B25J 9/1664* (2013.01); *B25J 9/1697* (2013.01)

(58) Field of Classification Search
CPC ...... B25J 9/1664; B25J 9/1669; B25J 9/1692; B25J 9/1694; B25J 9/1697
See application file for complete search history.

(56) References Cited

U.S. PATENT DOCUMENTS

| | | | |
|---|---|---|---|
| 6,629,053 B1 * | 9/2003 | Mooring | G05B 19/4083 |
| | | | 702/94 |
| 2016/0203799 A1 * | 7/2016 | Sonoda | B25J 9/1697 |
| | | | 901/47 |
| 2018/0126553 A1 * | 5/2018 | Corkum | B25J 9/1697 |
| 2021/0229279 A1 * | 7/2021 | Colbrunn | B25J 13/088 |
| 2022/0297301 A1 * | 9/2022 | Kelch | B25J 9/1692 |
| 2023/0008909 A1 | 1/2023 | Huang et al. | |
| 2023/0278218 A1 * | 9/2023 | Terry | B25J 9/1666 |
| | | | 700/255 |

FOREIGN PATENT DOCUMENTS

JP        2017100202 A     6/2017

* cited by examiner

*Primary Examiner* — Spencer D Patton
(74) *Attorney, Agent, or Firm* — Caldwell Intellectual Property Law

(57) ABSTRACT

An apparatus and method for automatic calibration of a robotic arm in a modular system. The apparatus includes at least a cluster configuration, at least a computing device comprising a memory and a processor, communicatively connected to the memory, wherein the processor is configured to receive a cluster configuration input, identify at least a calibration parameter, capture a coarse pose, transmit a first waypoint sequence to at least a modular component, modify the coarse pose of at least a configurable waypoint in the waypoint template, transmit a second waypoint sequence, and display, using a display device, an output.

18 Claims, 10 Drawing Sheets

APPARATUS AND METHOD FOR AUTOMATIC CALIBRATION OF A ROBOTIC ARM IN A MODULAR SYSTEM

FIELD OF THE INVENTION

The present invention generally relates to the field of automatic calibration of a robotic arm. In particular, the present invention is directed to an apparatus and a method for automatic calibration of a robotic arm in a modular system.

BACKGROUND

Robotic arm pick and place operations require precisely known waypoints so that the robotic arm can move around in space with precision. The creation of waypoints involves recording three-dimensional position and orientation of the robotic end effector as the robot arm is moved during manual calibration. These waypoints are good as long as there is no relative movement of components with respect to the robot arm that form the calibrated system. In case of a modular system, the components can be added or replaced and the precision of the waypoints associated with the new components may not be fine enough for safe operations. Manually calibrating the affected waypoints with fine precision of position and orientation is tedious and prone to errors.

SUMMARY OF THE DISCLOSURE

In an aspect, an apparatus for automatic calibration of a robotic arm in a modular system includes at least a processor and a memory communicatively connected to the at least a processor. The memory contains instructions configuring the processor to, receive a cluster configuration input, using a computing device, wherein the cluster configuration input comprises information associated with at least a modular component arrangement, identify at least a calibration parameter, using the computing device, as a function of the cluster configuration, capture a coarse pose, using the computing device, of the one or more modular components, transmit a first waypoint sequence to at least a modular component, wherein the first waypoint sequence is generated using the cluster configuration, a waypoint template, and a coarse pose, modify, using one or more control algorithms, the coarse pose of at least a configurable waypoint in the waypoint template, wherein modifying the coarse pose of the at least a configurable waypoint comprises receiving feedback associated with one or more modular components, generating a refined pose, wherein the at least a configurable waypoint and the feedback to modify the coarse pose, transmit a second waypoint sequence to the at least a modular component, wherein the second waypoint sequence is generated using the cluster configuration, a waypoint template, and a refined pose, display, using a display device, an output.

In another aspect, a method for automatic calibration of a robotic arm in a modular system includes receiving a cluster configuration input, using a computing device, wherein the cluster configuration input comprises information associated with at least a modular component arrangement, identifying at least a calibration parameter, using the computing device, as a function of the cluster configuration, capturing a coarse pose, using the computing device, of one or more modular components, executing a first waypoint sequence to at least a modular component, wherein the first waypoint sequence is generated using the cluster configuration, a waypoint template, and a coarse pose, modifying, using one or more control algorithms, the coarse pose of at least a configurable waypoint in the waypoint template, wherein modifying the coarse pose of the at least a configurable waypoint comprises receiving feedback associated with one or more modular components, generating a refined pose, wherein the at least a configurable waypoint and the feedback to modify the coarse pose, executing a second waypoint sequence to at least a modular component, wherein the second waypoint sequence is generated using the cluster configuration, a waypoint template, and a refined pose, displaying, using a display device, an output.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatus and methods for automatic calibration of a robotic arm in a modular system. The apparatus includes at least a computing device comprised of a processor and a memory communicatively connected to the processor. The memory instructs the processor to receive a cluster configuration input, using a computing device, wherein the cluster configuration input comprises information associated with at least a modular component arrangement. The memory instructs the processor to identify at least a calibration parameter, using the computing device, as a function of the cluster configuration. The memory instructs the processor to capture a coarse pose, using the computing device, of the one or more modular components. The memory instructs the processor to transmit a first waypoint sequence to at least a modular component, wherein the first waypoint sequence is generated using the cluster configuration, a waypoint template, and a coarse pose. The memory instructs the processor to modify, using one or more control algorithms, the coarse pose of at least a configurable waypoint in the waypoint template, wherein modifying the coarse pose of the at least a configurable waypoint comprises receiving feedback associated with one or more modular components, and generating a refined pose, wherein the at least a configurable waypoint and the feedback to modify the coarse pose. The memory instructs the processor to transmit a second waypoint sequence to the at least a modular component, wherein the second waypoint sequence is generated using the cluster configuration, a waypoint template, and a refined pose. The memory instructs the processor to display, using a display device, an output.

Figure 1:
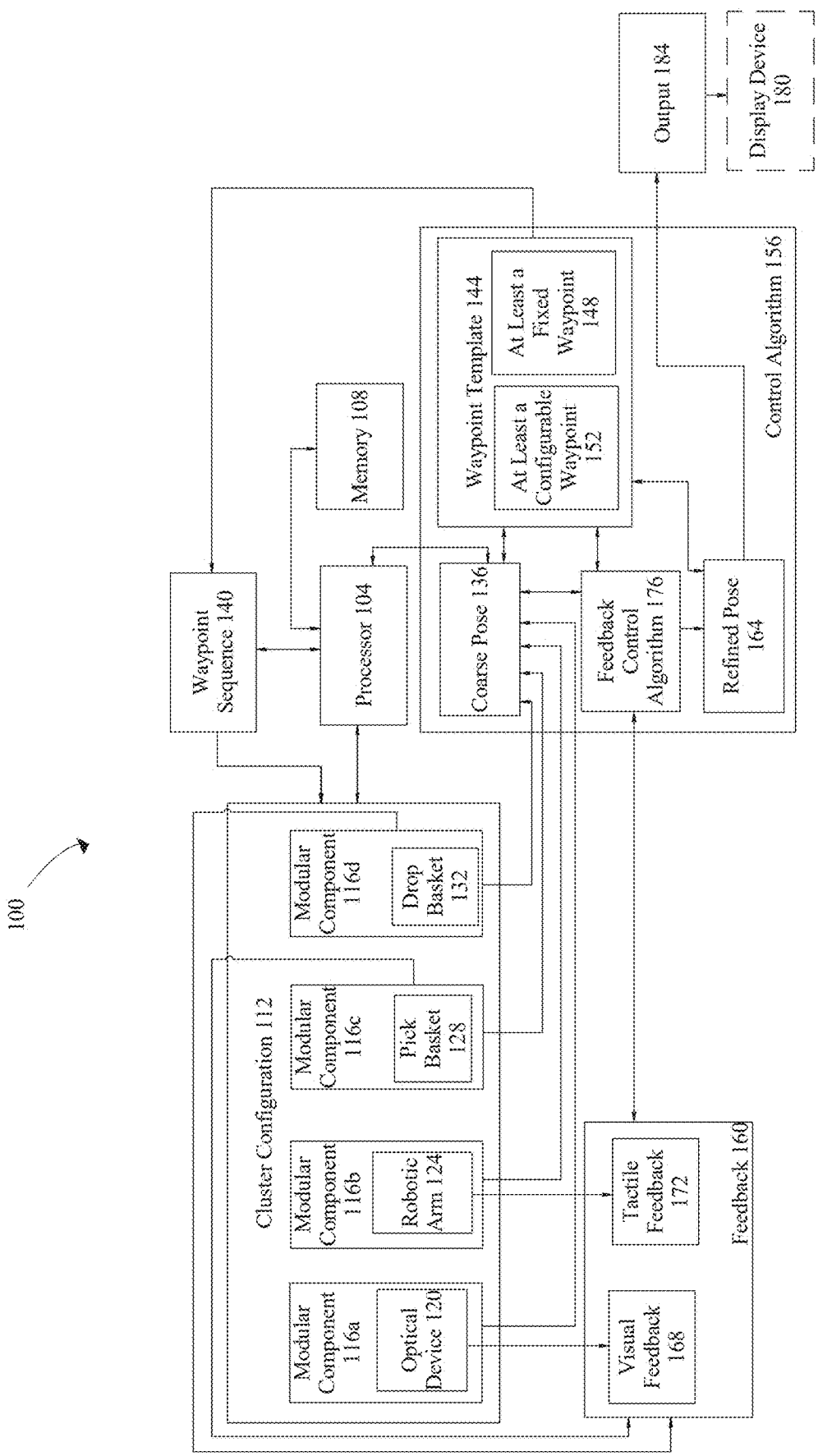
FIG. 1 is a block diagram of an apparatus for automatic calibration of a robotic arm in a modular system.

Referring now to FIG. 1, an exemplary embodiment of apparatus 100 for automatic calibration of a robotic arm in a modular system is illustrated. Apparatus 100 may include a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 may include a primary memory and a secondary memory. "Primary memory" also known as "random access memory" (RAM) for the purposes of this disclosure is a short-term storage device in which information is processed. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power. "Secondary memory" also known as "storage," "hard disk drive" and the like for the purposes of this disclosure is a long-term storage device in which an operating system and other information is stored. In one or remote embodiments, information may be retrieved from secondary memory and transmitted to primary memory during use. In one or more embodiments, secondary memory may be referred to as non-volatile memory wherein information is preserved even during a loss of power. In one or more embodiments, data within secondary memory cannot be accessed by processor. In one or more embodiments, data is transferred from secondary to primary memory wherein processor 104 may access the information from primary memory.

Still referring to FIG. 1, apparatus 100 may include a database. The database may include a remote database. The database may be implemented, without limitation, as a relational database, a key-value retrieval database such as a NOSQL database, or any other format or structure for use as database that a person skilled in the art would recognize as suitable upon review of the entirety of this disclosure. The database may alternatively or additionally be implemented using a distributed data storage protocol and/or data structure, such as a distributed hash table or the like. The database may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, apparatus 100 may include and/or be communicatively connected to a server, such as but not limited to, a remote server, a cloud server, a network server and the like. In one or more embodiments, the computing device may be configured to transmit one or more processes to be executed by server. In one or more embodiments, server may contain additional and/or increased processor power wherein one or more processes as described below may be performed by server. For example, and without limitation, one or more processes associated with machine learning may be performed by network server, wherein data is transmitted to server, processed and transmitted back to computing device. In one or more embodiments, server may be configured to perform one or more processes as described below to allow for increased computational power and/or decreased power usage by the apparatus computing device. In one or more embodiments, computing device may transmit processes to server wherein computing device may conserve power or energy.

Further referring to FIG. 1, apparatus 100 may include any "computing device" as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing devices operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 receives cluster configuration 112 input, using a computing device, wherein cluster configuration 112 input includes information associated with at least a modular component 116*a-d* arrangement. As used in this disclosure, "input" may include data describing a layout and/or configuration of cluster configuration 112. Without limitation, input provides each modular component 116*a-d* how cluster configuration 112 is set up and provides the necessary information to the system to function properly. Without limitation, the input may transmit, for example, the following information to modular component 116*a-d* that there are 10 pick baskets 128 on the left side of the room, 10 drop baskets 132 on the right side of the room, 3 optical devices 120 in the back center of the room, and 2 robotic arms 124 with magnetic gripper effectors in the center of the room. In another non-limiting example, input may also include sensor feedback from modular components 116*a-d* to describe the existing environment, such as, the dimensions of the space, the temperature of the room, the amount of vibration on a surface, and the like.

With continued reference to FIG. 1, as used in this disclosure, a "cluster configuration" is an arrangement of multiple modular components that are used to run a specific system, such as a robotic system. In a non-limiting example, cluster configuration 112 may include interconnected modular components. Without limitation, cluster configuration 112 may be designed to work together to achieve a common goal of the system. In a non-limiting embodiment, cluster configuration 112 may be designed to permit at least a modular component 116*a-d* to communicate with a different at least a modular component 116*a-d* in cluster configuration 112. In another non-limiting embodiment, cluster configuration 112 may be designed to permit at least a modular component 116*a-d* to communicate with a plurality of modular components 116*a-d* in cluster configuration 112. In a non-limiting example, cluster configuration 112 may include various arrangements of one or more modular components. In a non-limiting example, cluster configuration 112 may improve performance of apparatus 100 by organizing and distributing tasks more efficiently to at least a modular component 116*a-d*. As used in this disclosure, a "modular component" is a singular self-contained component within the cluster configuration that is designed to perform a specific function. In a non-limiting example, modular component 116*a-d* may include hardware components or software components, and/or any combination of hardware and software. In a non-limiting example, modular component 116*a-d* may include one or more field programmable gate arrays (FPGAs) and other semiconductor devices that may be programmed to perform various functions. In a non-limiting example, modular component 116*a-d* may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC). In a non-limiting example, at least a modular component 116*a-d* may be designed to be easily replaced, interchanged, and/or upgraded without impeding apparatus 100. In another non-limiting example, at least a modular component 116*a-d* may provide flexibility, scalability, and ease of maintenance of apparatus 100. Without limitation, at least a modular component 116*a-d* may include standard components which enable at least a modular component 116*a-d* to interact with different at least a modular component 116a-d within cluster configuration 112. For example, and without limitation, at least a modular component 116a-d may include standard mechanical interfaces, electrical connections, and communication protocols that allow at least a modular component 116a-d to be seamlessly integrated and work in combination with a plurality of modular components 116a-d. In a non-limiting example, modular component 116a-d may include optical device 120, robotic arm 124, pick basket 128, drop basket 132, and the like, as discussed in more detail below. In another non-limiting example, at least a modular component 116a-d, may be any combination and/or number of optical device 120, robotic arm 124, pick basket 128, drop basket 132, and the like, as discussed herein. In another non-limiting example, modular component 116a-d may include one or more components such as a motor, including a servo motor and/or a stepper motor, movable components, such as, rigid parts to be manipulated using motors, joints, bearings, effectors such as grippers, pinchers, process tools, suction cups, tool changers, sensors, vacuum gripper, magnetic grippers, and the like, sensors such as, touch sensors, pressure sensors, temperature sensors, light sensors, sound sensors, and the like, actuators such as, linear actuators, solenoid actuators, pneumatic actuators, hydraulic actuators, rotary actuators, electric actuators, and the like, and other components. In another non-limiting example, cluster configuration 112 may vary in the number of optical device 120, number of zones per optical device 120, and/or type of attachment. For example, without limitation, instead of four optical devices 120, cluster configuration 112 may have two optical devices 120. In another non-limiting example, instead of two zones, there may be a single zone and only one pick basket 128 and drop basket 132 as attachments for that zone. In one or more embodiment, the form factor of cluster configuration 112 may be adapted to minimize spatial footprint. In one or more non-limiting embodiments, the type of attachments may vary, for example, the type of pick basket 128 or the type of drop basket 132 may change. Additionally or alternatively, some intermediate baskets may be added to cluster configuration 112.

With continued reference to FIG. 1, one or more modular components 116a-d may include optical device 120, robotic arm 124, pick baskets 128, and drop baskets 132. As used in this disclosure, an "optical device" is a device designed to capture images of physical objects and convert them to digital medium. In a non-limiting example, optical device may be one or more scanning devices. In a non-limiting example, processor 104 may receive scanned images and/or feedback directly from optical device 120 that scanned a microscope slide. In some cases, optical device 120 may include devices or systems used to digitize slides containing biomedical specimens (e.g., tissue samples). As a non-limiting example, optical device 120 may include digital cameras, digital microscopes, digital pathology scanners, or the like.). In some cases, processor 104 may select parameters associated with optical device 120 such as, without limitation, magnification level, focus settings, scanning pattern, or the like. Additional disclosure related to optical device 120 and slide digitization process may be found in U.S. Patent Application No. 63/466,950, filed on May 16, 2023, entitled "SYSTEMS AND METHODS FOR INLINE QUALITY CONTROL OF SLIDE DIGITIZATION,", which is incorporated herein by reference in its entirety. In some embodiments, processor 104 may be configured to control the operation of optical device 120 to automate the slide digitization process. For example, and without limitation, processor 104 may send instructions to optical device 120 to scan or rescan selected portions of a slide (e.g., areas identified by x-, y-, and/or z-coordinates or bounding boxes).

As used in this disclosure, a "robotic arm" is a mechanical device or manipulator that mimics the structure and function of a human arm. In a non-limiting example, robotic arm 124 may include effectors. For example, without limitation, an effector may include a gripping tool designed to pick up an object from pick basket 128, carry the object to at least a modular component 116a-d, and place the object on an interface for at least a modular component 116a-d to interact with the object. Continuing the non-limiting example, robotic arm 124 may pick the object from the modular component 116a-d, carry the object to drop basket 132 and leave the object at drop basket 132. In some cases, robotic arm 124 may interact with a plurality of modular components 116a-d. In one or more embodiment, robotic arm 124 is controlled by processor 104 and receives instructions on tasks to perform from processor 104. As used in this disclosure, a "pick basket" is a container with a specified location that stores an object for use in the system. As used in this disclosure, a "drop basket" is a container with a specified location that stores an object after the object has been used in the system. Additional disclosures related to robotic arm 124 may be the same or similar to the apparatus described in U.S. patent application Ser. No. 18/382,386, filed on Oct. 20, 2023, entitled "APPARATUS AND METHOD OF USE OF A MECHANISM THAT CONVERTS ROTARY MOTION INTO LINEAR MOTION,", which is incorporated herein by reference in its entirety.

Still referring to FIG. 1, processor 104 identifies at least a calibration parameter, using the computing device, as a function of cluster configuration 112. As used in this disclosure, a "calibration parameter" is a setting used to adjust measurement or performance of a device; various settings may function as calibration parameters. Without limitation, calibration parameters are generally determined using a predetermined reference point for comparison and ensure accuracy of the system measurement and/or performance. In a non-limiting example, calibration parameters may include compensation offsets of a system, sensitivity of the system, linearity (i.e., the output measurement changes proportionally to the changes in input), temperature compensations, drift correction, and the like. For example, and without limitation, a calibration parameters for optical device 120 may include pixel offset, pixel gain, focal length, distortion correction, color calibration, noise reduction, resolution accuracy, and the like. Continuing this non-limiting example, one or more calibration parameters of optical device 120 may be adjusted depending on the type of optical device, the intended application of the optical device output, environmental factors, and general maintenance for optical device 120 reliability and performance. In a non-limiting example, processor 104 may instruct at least a modular component 116a-d to adjust one or more calibration parameters to improve function of at least a modular component 116a-d. In a non-limiting example, calibration parameters may calibration parameters for various types of equipment which may include gain, offset voltage, poles, zeros, power supply effects, temperature effects, focal length, principal point coordinates, affinity and non-orthogonality coefficients, radial distortion coefficients, tangential distortion coefficients, accuracy, process tolerance, reject error, error limit, maximum permissible error, error allowed, deviation, and the like.

Still referring to FIG. 1, processor 104 captures coarse pose 136, using the computing device, of one or more modular components 116*a*-*d*. As used in this disclosure, a "coarse pose" is an initial pose generated without negative sensor feedback. In a non-limiting example, coarse pose 136 may be an estimated position and/or orientation in space of a specific object or device relative to the given reference frame. Specifically, as used herein, "pose" refers to position and orientation of a point in space. In a non-limiting example, coarse pose 136 may provide an approximate location for robotic arm 124 relative to cluster configuration 112, wherein coarse pose 136 may be refined to provide a more detailed and exact position and orientation for robotic arm 124 relative to cluster configuration 112. In a non-limiting example, coarse pose 136 of robotic arm 124 within cluster configuration 112 may include a position in the center of a space with a plurality of modular components 116*a*-*d* surrounding robotic arm 124, where robotic arm 124 is oriented vertically upright on a robotic arm stand and/or post with robotic arm 124 effector facing downward, toward the floor of the space. Without limitation, coarse pose 136 may be transmitted from robotic arm 124 to processor 104.

Still referring to FIG. 1, processor 104 transmits first waypoint sequence 140, wherein first waypoint sequence 140 is generated using cluster configuration 112, waypoint template 144, and coarse pose 136. As used in this disclosure, a "waypoint sequence" is a series of predetermined waypoints that define the path of movement for a specific device. As used herein, a "waypoint" is a predetermined point in space with a location and orientation. In a non-limiting example, waypoint sequence is transmitted to modular component 116*a*-*d* and instructs modular component 116*a*-*d* how to move through space. Without limitation, robotic arm 124 may use waypoint sequence 140 to operate in cluster configuration 112. In another non-limiting example, generating a waypoint may involve recording the three-dimensional position (i.e., Px,Py,Pz coordinates) and orientation (i.e., Rx, Ry, Rz coordinates) of the effector of robotic arm 124 as robotic arm 124 moves through space. In a non-limiting example, a waypoint may use vectors, matrices, and/or a vector matrix. As used in this disclosure, a "vector" as defined in this disclosure is a data structure that represents one or more quantitative values and/or measures the position vector. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted ||a|| indicating the vector's length or size, and may be defined, as a non-limiting example, according to a Euclidean norm for an n-dimensional vector a as:

$$\|a\| = \sqrt{\sum_{i=0}^{n} a_i^2}$$

In an embodiment, and with continued reference to FIG. 1, each waypoint may be represented by a dimension of a vector space; as a non-limiting example, each element of a vector may include a number representing an enumeration of co-occurrences of position represented by the vector with orientation. Alternatively, or additionally, dimensions of vector space may not represent distinct waypoints, in which case elements of a vector representing a position may have numerical values that together represent a geometrical relationship to a vector representing an orientation, wherein the geometrical relationship represents and/or approximates a semantic relationship between the position and the orientation. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

Any vectors as described herein may be scaled, such that each vector represents each attribute along an equivalent scale of values. In an embodiment associating waypoints to one another as described above may include computing a degree of vector similarity between a vector representing each position and a vector representing orientation; vector similarity may be measured according to any norm for proximity and/or similarity of two vectors, including without limitation cosine similarity. As used in this disclosure "cosine similarity" is a measure of similarity between two non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

As used in this disclosure "matrix" is a rectangular array or table of numbers, symbols, expressions, vectors, and/or representations arranged in rows and columns. For instance, and without limitation, matrix may include rows and/or columns comprised of vectors representing waypoints, where each row and/or column is a vector representing a distinct position; position represented by vectors in matrix may include Px, Py, and Pz coordinates as described above by using device encoders, including without limitation orientation vectors which may include Rx, Ry, and Rz coordinates, as described above. As a non-limiting example matrix may include waypoint sequence 140 which may include a plurality of waypoints having a position value and a rotation value.

Matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, T, wherein matrix U, represents left singular vectors consisting of an orthogonal matrix of m rows and m columns, matrix S represents a singular value diagonal matrix of m rows and n columns, and matrix VT represents right singular vectors consisting of an orthogonal matrix of n rows and n columns according to the vectors consisting of an orthogonal matrix of n rows and n columns according to the function:

$$A_{m \times n} = U_{m \times m} S_{m \times n} V_{n \times n}^T$$

singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U.

The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, as used in this disclosure, a "waypoint template" is a predefined sequence of waypoints designed to facilitate execution of the sequence. In a non-limiting example, waypoint template 144 may include more than one waypoint. In a non-limiting example, waypoint template 144 may be stored by memory 108 and used at a later time, thereby facilitating the generation of the same or similar waypoint sequence 140 as a previously defined sequence. In a non-limiting example, waypoint templates 144 may be created for paths with waypoints for known robotic arm 124 movements associated with a specified cluster configuration 112. In one or more embodiments, waypoint template 144 may include separate templates for at least a fixed waypoint 148 and at least a configurable waypoint 152. Continuing the non-limiting example, the separate template for at least a fixed waypoint 148 may include waypoints with known fine pose (i.e., waypoints with fine precision). With further continuation to the non-limiting example, the separate template for at least a configurable waypoint 152 may include waypoints with known coarse pose (i.e., waypoints with coarse precision). In another non-limiting example, for a particular cluster configuration 112, the waypoints may be used by robotic arm 124 to move the scan slides around to different at least a modular component 116a-d space and the waypoints may be partitioned into fixed waypoints and configurable waypoints based on whether the waypoint is associated with a configurable at least a modular component 116a-d.

With continued reference to FIG. 1, waypoint template 144 may include at least a fixed waypoint 148 and at least a configurable waypoint 152. As used in this disclosure, a "fixed waypoint" is a waypoint of a known pose with high precision. Without limitation, fine precision in pose may be achieved by using features on the configurable at least a modular component 116a-d, such as, 3D fiducials, wherein the 3D fiducials enable an automated determination of at least a fixed waypoint 148 position and orientation in space, as discussed in more detail below. As used in this disclosure, a "configurable waypoint" is a waypoint of a known pose associated with a coarse pose. In a non-limiting example, configurable waypoints may require calibration to refine their pose to a higher precision. In an embodiment, cluster configuration 112 may include changing at least a modular component 116a-d, wherein added or replaced modular components may require new configurable waypoints 152 to be generated with waypoints of high precision in pose which are associated with the new modular components to ensure safe operations of robotic arm 124 in cluster configuration 112. As described in more detail below, at least a configurable waypoint 152 may be calibrated and refined from a coarse pose to a refined pose.

With continued reference to FIG. 1, at least a configurable waypoint 152 may be associated with at least a modular component 116a-d. In a non-limiting example, optical device 120 of at least a modular component 116a-d may be associated with at least a configurable waypoint 152 wherein robotic arm 124 may receive the waypoint information and use that information to navigate to optical device 120 and carefully place a glass slide in position for capturing feedback 160, as further discussed below. Similarly, pick basket 128 and drop basket 132 may be associated with at least a configurable waypoint 152, thereby permitting robotic arm 124 to navigate to pick basket 128 and drop basket 132 with caution and retrieve and/or deliver the glass slide to the respective locations without damaging the glass slide.

Still referring to FIG. 1, processor 104 refines, using one or more control algorithms 156, coarse pose 136 of at least a configurable waypoint 152 in waypoint template 144, wherein modifying coarse pose 136 of at least a configurable waypoint 152 includes receiving feedback 160 associated with one or more modular components 116a-d, generating refined pose 164, wherein at least a configurable waypoint 152 and feedback 160 modify coarse pose 136. As used in this disclosure, a "control algorithm" is a set of mathematical rules designed to determine adjustments needed to achieve a desired outcome in a control system. In a non-limiting embodiment, control algorithm 156 may include machine learning algorithms, wherein the machine learning algorithms may include one or more machine learning models. Without limitation, a machine learning model may include a neural network. As used in this disclosure, a "neural network" is a computational model consisting of interconnected nodes organized in layers as further discussed in FIG. 6 and FIG. 7. As used in this disclosure, a "feedback" is information obtained from a component of a system. In a non-limiting example, feedback 160 may include information associated with at least a modular component 116a-d. In a non-limiting example, feedback 160 may include information used to maintain apparatus 100 stability and/or regulate performance. In a non-limiting example, feedback 160 may be used to generate refined pose 164 associated with at least a modular component 116a-d. As used in this disclosure, a "refined pose" is a subsequent pose generated by at least one iteration of negative sensor feedback. In a non-limiting example, refined post 164 may include a more precise position and orientation of an object in a reference frame. For example, without limitation, refined pose 164 of robotic arm 124 may be generated from coarse pose 136 using feedback 160. In a non-limited embodiment, coarse pose 136 of robotic arm 124 effector may be within +/−2 inches when initially set on the post, and refined pose 164 of robotic arm 124 effector after calibration may be +/−0.001 inch. Without limitation, refined pose 164 provides a more precise calibration of robotic arm 124.

With continued reference to FIG. 1, feedback 160 may include visual feedback 168 from a macro-imaging setup inside of optical device 120 and tactile feedback 172 from robotic arm 124. As used in this disclosure, "visual feedback" is visual information based on observed state of a system. In a non-limiting example, visual feedback 160 may be provided to apparatus 100 real time. Without limitation, visual feedback 168 may be captured using optical device 120 macro-imaging setup. As used in this disclosure, a "macro-imaging setup" is an optical device configuration designed to capture high-resolution images of small objects at close range. In a non-limiting example, optical device 120 may include a microscope wherein the macro-imaging setup inside the microscope is calibrated to capture detailed, enhanced, sharp images of biomaterial on glass slides. As used in this disclosure, "tactile feedback" is physical feedback associated with touch, also known as haptic feedback. In a non-limiting example, tactile feedback 172 may include information related to a probe attached to robotic arm 124, wherein the touch off points of the probe against at least a modular component 116a-d may provide tactile feedback to apparatus 100. Without limitation, visual and tactile feedback may be transmitted to processor 104. In another non-limiting example, robotic arm 124 effector may produce tactile feedback using the tip of effector attachment and the surrounding environment within cluster configuration 112.

With continued reference to FIG. 1, visual feedback 168 may be generated utilizing a 3D fiducial of optical device 120. As used in this disclosure, a "3D fiducial" is a reference point in a three-dimensional space used to calibrate a component in the system. Without limitation, 3D fiducials provide known pose, for example, position (i.e., Px, Py, and Pz coordinates) and orientation (Rx, Ry, and Rz coordinates). In a non-limiting example, a 3D fiducial may be designed to be easily detectible in a system by sensors, optical devices, and the like, based on their shape, pattern, special markings, and the like. In a non-limiting example, a 3D fiducial may provide pertinent information used to register and align one or more optical devices 120 within cluster configuration 112 by accurately determining the spatial relationships between the devices in a unified coordinate system.

With continued reference to FIG. 1, the 3D fiducial may include a calibration slide. As used in this disclosure, a "calibration slide" is a tool used to calibrate an optical device. In a non-limiting embodiment, a calibration slide may be composed of glass and may include special markings and/or patterns on the surface which may be used to calibrate optical device 120. Without limitation, the calibration slide may include a transparent glass slide with precision-engineered features, such as, grids, scales, patterns, or fiducial markers, etched or deposited onto the slide surface. Continuing the non-limiting example, the precision-engineered features may provide known dimensions and spatial arrangements, allowing the features to serve as reference standards for optical device 120 calibration. For example, if optical device 120 captures a scan of the calibration slide and it is out of focus, optical device 120 may adjust its internal scan parameters to bring the calibration slide into focus. Continuing the non-limiting example, optical device 120 may take a subsequent, focused, scan, wherein the subsequent scan is offset by a specific margin in the Px-direction of a cartesian coordinate system. In this case, without limitation, optical device 120 may receive instructions to compensate for the previously mentioned offset and bring the calibration plate into proper positioning. Without limitation, compensation may be performed manually, and/or automatically using the aforementioned control algorithm.

With continued reference to FIG. 1, one or more control algorithms 156 may include feedback control algorithm 176. As used in this disclosure, a "feedback control algorithm" is a type of control algorithm used to regulate a system's behavior by continuously adjusting the inputs based on real-time feedback from the system. In a non-limiting example. Feedback control algorithm 176 may include a proportional-integral-derivative (PID) control algorithm. As used herein, a "PID" control algorithm is a feedback control mechanism designed to regulate the output of a system based on the difference between a desired reference point and a measured point in the system. In a non-limiting example, the PID controller may continuously calculate and adjust the control signal applied to the system in order to reduce the error of the system and maintain stable system performance. Without limitation, feedback control algorithm 176 is defined in more detail in FIG. 8.

With continued reference to FIG. 1, feedback control algorithm 176 refines coarse pose 136 using dimensions and positions extracted real-time from the calibration slide. In a non-limiting example, the calibration slide and visual feedback 168 from the macro-imaging setup of optical device 120 may incorporate visual feedback 168 into feedback control algorithm 176, using dimensional analysis of the calibration slide from macro-imaging setup of optical device 120 and refine the pose of at least a configurable waypoint 152 along one component of pose taken at a time using the position of the calibration slide extracted real time during feedback control algorithm 176 loop.

Still referring to FIG. 1, processor 104 transmits second waypoint sequence 140, wherein second waypoint sequence 140 is generated using cluster configuration 112, waypoint template 144, and refined pose 164. In a non-limiting example, at least a configurable waypoint 152 associated with optical device 120 may be calibrated using a two-step refinement process, wherein the first step includes refining coarse pose 136 of optical device 120 using 3D fiducial on optical device 120 and tactile feedback 172 from robot arm 124. With continued reference to the previous non-limiting example, the second step of the two step refinement process may include refining coarse pose 136 using the calibration slide and visual feedback 168 from macro-imaging setup of optical device 120.

Still referring to FIG. 1, display device 180 displays an output. As used in this disclosure, a "display device" refers to an electronic device that visually presents information to the entity. In some cases, display device may be configured to project or show visual content generated by computers, video devices, or other electronic mechanisms. In some cases, display device may include a liquid crystal display (LCD), a cathode ray tube (CRT), a plasma display, a light emitting diode (LED) display, and any combinations thereof. In a non-limiting example, one or more display devices may vary in size, resolution, technology, and functionality. Display device may be able to show any data elements and/or visual elements as listed above in various formats such as, textural, graphical, video among others, in either monochrome or color. Display device may include, but is not limited to, a smartphone, tablet, laptop, monitor, tablet, and the like. Display device may include a separate device that includes a transparent screen configured to display computer generated images and/or information. In some cases, display device may be configured to present a graphical user interface (GUI) to a user, wherein a user may interact with a GUI. In some cases, a user may view a GUI through display. Additionally, or alternatively, processor 104 be connected to display device. In one or more embodiments, transmitting output 184 may include displaying output 184 at display device 180 using a visual interface. As used in this disclosure, a "visual interface" is a digital display that presents information, options, interactive elements to users in an intuitive and visually appealing manner. In some embodiments, visual interface may include at least an interface element. As used in this disclosure, "at least an interface element" is a portion of visual interface. In a non-limiting example, at least an interface element may include, without limitation, a button, a link, a checkbox, a text entry box and/or window, a drop-down list, a slider, or any other interface element that may occur to a person skilled in the art upon reviewing the entirety of this disclosure. In some embodiments, at least an interface element may include an event handler. As used in this disclosure, an "event handler," is a module, data structure, function, and/or routine that performs an action on remote device in response to a user interaction with event handler graphic. For instance, and without limitation, an event handler may record data corresponding to user selections of previously populated fields such as drop-down lists and/or text auto-complete and/or default entries, data corresponding to user selections of checkboxes, radio buttons, or the like, potentially along with automatically entered data triggered by such selections, user entry of textual data using a keyboard, touchscreen, speech-to-text program, or the like. Event handler may generate prompts for further information, may compare data to validation rules such as requirements that the data in question be entered within certain numerical ranges, and/or may modify data and/or generate warnings to a user in response to such requirements.

With continued reference to FIG. 1, output 184 comprises a validation metric for robotic arm 124 positioning relative to at least a modular component 116a-d. As used in this disclosure, "validation" is a confirmation of whether or not a device is within a specified calibration tolerance based on a predefined standard limit. In a non-limiting example, a validation may compare the measured value of a device to the expected or known reference values to produce a given deviation, wherein the deviation is what determines whether the device is properly calibrated to perform its given task accurately and reliably. In another non-limiting example, output 184 may indicate that at least a modular component 116a-d is within a specified calibration limit. For example, and without limitation, output 184 associated with the calibration of robotic arm 124 may indicate that robotic arm 124 is measuring within +/−0.001 of an inch of a specific objects position which may be within the calibration tolerance set by robotic arm 124 calibration parameters and thereby generate an output that confirms and/or validates robotic arm 124 pose is acceptable to perform required tasks.

Figure 2B:
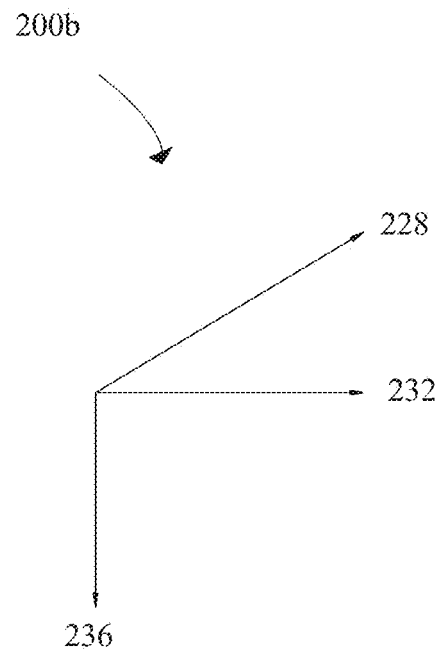
FIG. 2B illustrates the dimensions along which a cluster configuration can vary.
Figure 2A:
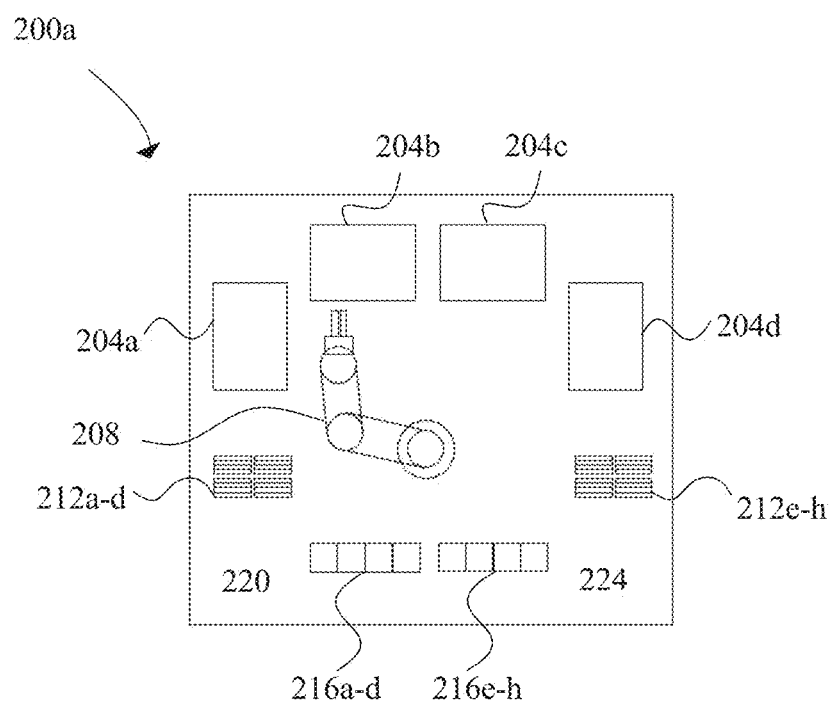
FIG. 2A is a diagram of an exemplary embodiment of the cluster configuration with one robotic arm, four optical devices, and corresponding pick baskets and drop baskets.

Referring now to FIG. 2A, an exemplary embodiment, 200a, of a cluster configuration with one robotic arm, four optical devices, and corresponding pick baskets and drop baskets. In one or more embodiments, cluster configuration 200a may include a plurality of modular components 204a-h which may include optical device 204a-d, robotic arm 208, pick baskets 212a-h, drop baskets 216a-h, and the like. In a non-limiting example, robotic arm 208 is centrally located in an optimized cluster configuration 200a to allow robotic arm 208 to move objects from one modular component, such as, without limitation, from pick basket 212a to optical device 204a-d and then to drop basket 216a-h when the required task has been performed. In another non-limiting example, cluster configuration may include two zones: zone A 220 and zone B 224, wherein once robotic arm 208 has finished processing pick baskets 212a-h from zone A 220 using optical device 204, optical device 204 will continue to zone B 224. In an embodiment, optical device 204a may scan slides from pick basket 212a and these slides may end up in drop basket 216a in zone A 220 and later in zone B 224.

Referring now to FIG. 2B illustrates the dimensions along which a cluster configuration can vary 200b. In an embodiment, the number of optical devices 228 may vary along one axis, the number of zones per optical device 232 may vary on a secondary axis, and the type of attachment 236 may vary on the tertiary axis. In an embodiment, cluster configuration 200a may include two optical devices 204a-b instead of four optical devices 204a-d. In another non-limiting embodiment, cluster configuration 200a may include a single zone instead of two zones: zone A 220 and zone B 224 and robotic arm 208 may only retrieve slides from pick baskets 212a-d and drop baskets 216a-d for that zone. In another non-limiting embodiment, the form factor of cluster configuration 200a may be adapted accordingly to minimize footprint. In another non-limiting embodiment, the type of attachments may vary, for example, the type of pick basket 212a-h or type of drop basket 216a-h may change. Additionally or alternatively, in a non-limiting example, some intermediate baskets may be added to cluster configuration 200a.

Figure 3B:
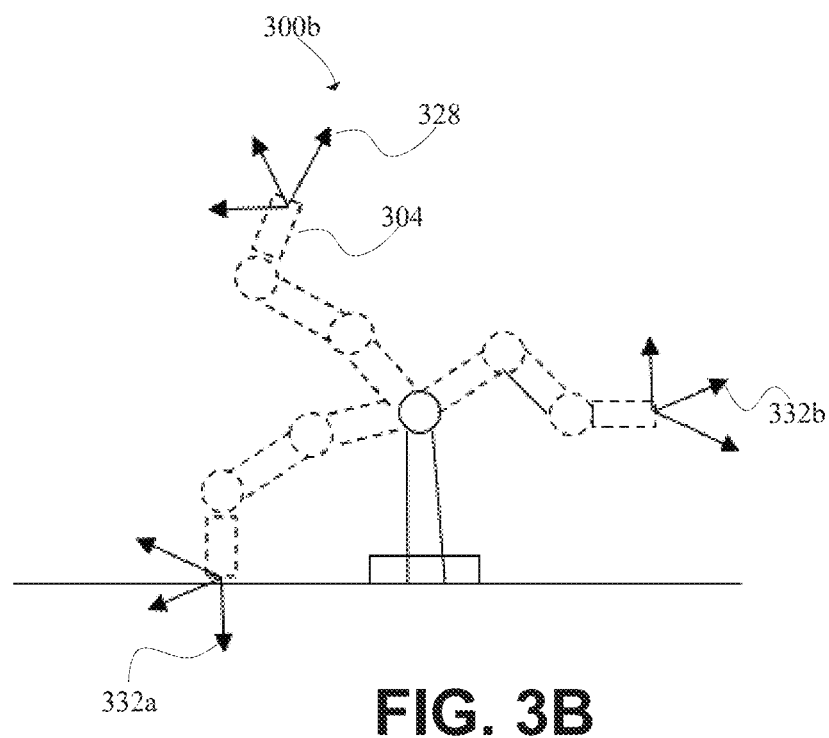
FIG. 3B is a diagram of an exemplary embodiment of a waypoint template for a robotic arm in various pose with fixed waypoints and configurable waypoints.
Figure 3A:
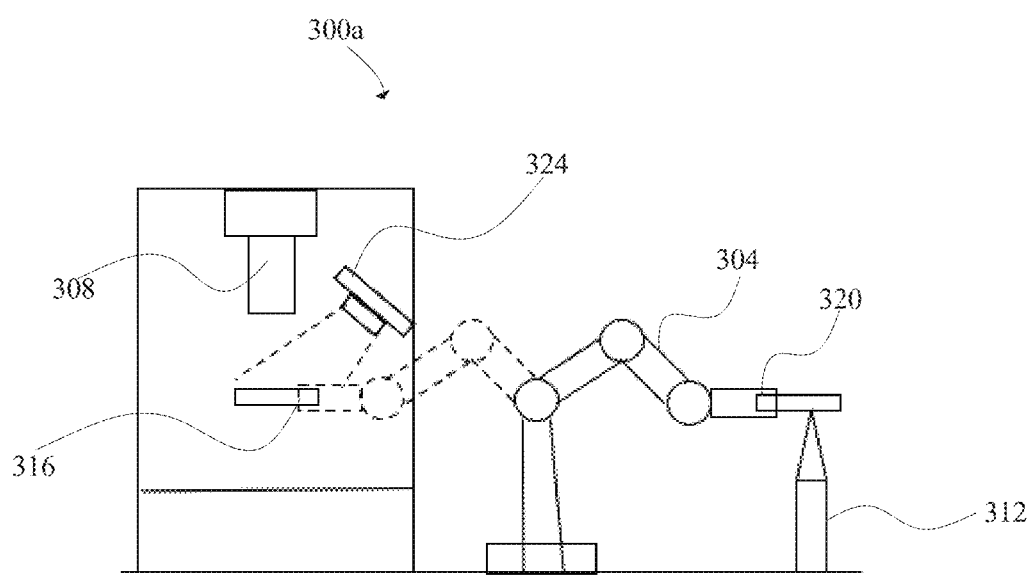
FIG. 3A is a diagram of an exemplary embodiment of a waypoint template for a robotic arm with configurable waypoints associated with an optical device and pick baskets and drop baskets.

Referring now to FIG. 3A, diagram of an exemplary embodiment, 300a, of a waypoint template for a robotic arm with configurable waypoints associated with an optical device, pick baskets, and drop baskets. In a non-limiting embodiment, robotic arm 304 may be configured to navigate to waypoints associated with optical device 308 and/or attachment 312. As used in this disclosure, an "attachment" is an additional component to a system. In a non-limiting example, attachment 312 may include pick baskets and drop baskets. In a non-limiting embodiment, robotic arm 304 may navigate to optical device waypoint 316 and then attachment waypoint 320. In a non-limiting example, macro-imaging setup 324 is used to generate feedback for the system for calibration. In a non-limiting example, optical device waypoint 316 and attachment waypoint 320 may be known as part of the configuration at coarse precision. Continuing the non-limiting example, the coarse precision may not be of sufficient precision for handling glass slides, thus each optical device 308 and attachment 312 may be mounted in the cluster configuration with some variation in pose and be calibrated to refine the precision for safe handling of glass slides.

Referring now to FIG. 3B, diagram of an exemplary embodiment, 300b, of a waypoint template for a robotic arm in various pose with fixed waypoints and configurable waypoints. In an embodiment, robotic arm 304 may move in a defined path using a waypoint template. In an embodiment, the waypoint template may include fixed waypoints 328 and configurable waypoints 332a-b. In an embodiment, generally the number of fixed waypoints 328 is higher than the number of configurable waypoints 332a-b. In an embodiment, configurable waypoints 332a-b are the waypoints located at the start and end of robotic arm 304 path. In an embodiment, configurable waypoints 332a-b may be associated with optical device 308 and attachment 312 as discussed above.

Figure 4:
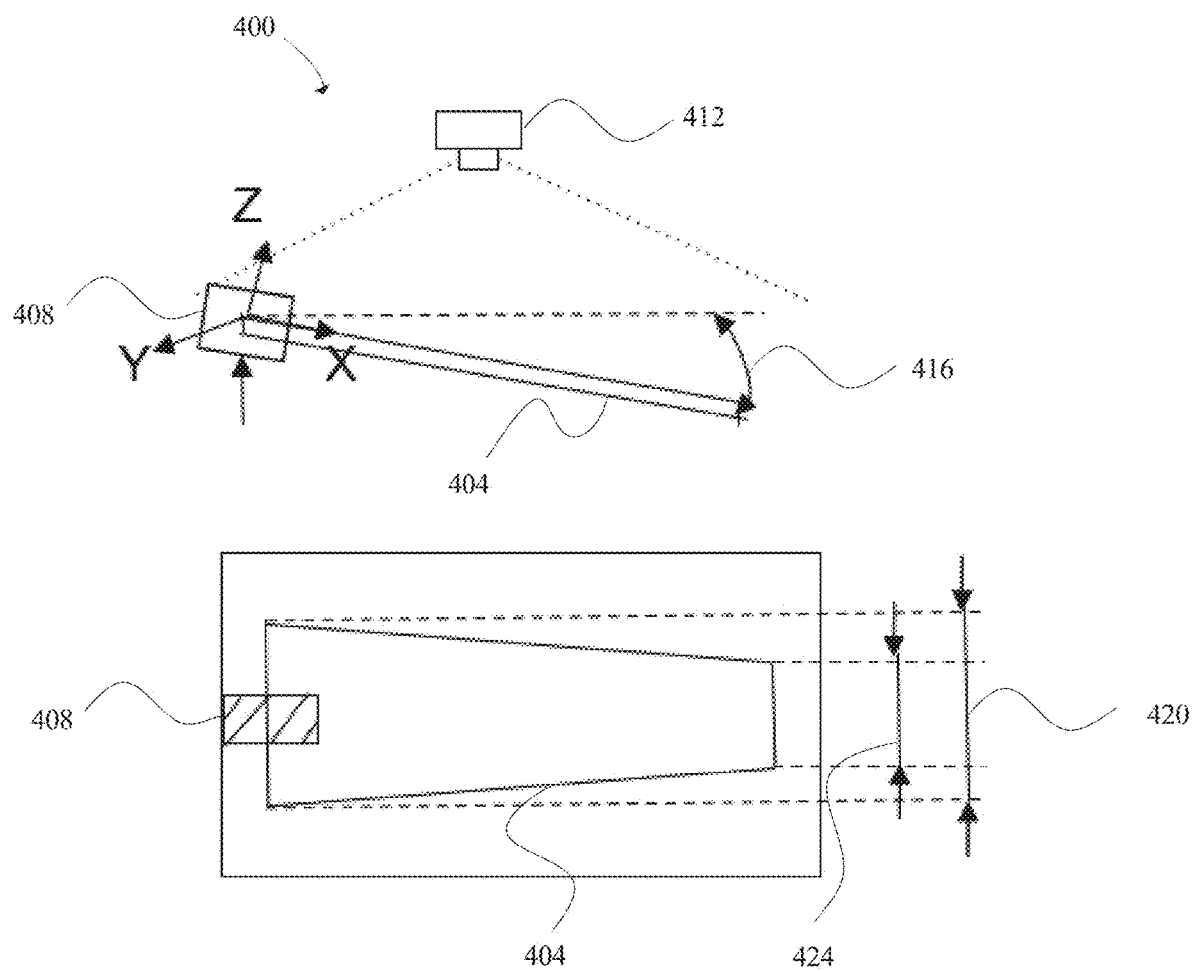
FIG. 4 is a diagram of an exemplary embodiment of visual feedback used to refine a waypoint associated with an optical device using a feedback control algorithm.

Referring now to FIG. 4 is a diagram of an exemplary embodiment, 400, of visual feedback used to refine a waypoint associated with an optical device using a feedback control algorithm. In a non-limiting embodiment, calibration slide 404 may be used as visual feedback during PID control to refine pose of robotic arm effector 408 waypoint associated with macro camera 412 associated with an optical device. In a non-limiting embodiment, the dimensions of calibration slide 404 are known a priori. In another non-limiting example, the visual feedback from macro camera 412 of calibration slide 404 may fine tine the pose (i.e., position Px, Py, Pr, and orientation Rx, Ry, Rz) of the waypoint can in an iterative fashion. In a non-limiting example, each of the six values (Px, Py, Pz, Rx, Ry, Rz) may use different visual cues to refine the waypoint pose by manipulating robot gripper 408. In a non-limiting example. Ry value 406 is the orientation of robotic arm effector 408 around the y-axis. In a non-limiting example, the refinement of Ry value 406 is shown using the visual assessment of proximal width 420 of calibration slide 404 and distal width 424 of calibration slide 404. In a non-limiting example, the difference between proximal width 420 of calibration slide 404 and distal width 424 of calibration slide 404, may be called the slide width delta. In a non-limiting example, the slide width delta may be used to correct Ry value 406 by gradually adjusting Ry value 406 until the slide width delta is within acceptable tolerance.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

Figure 5:
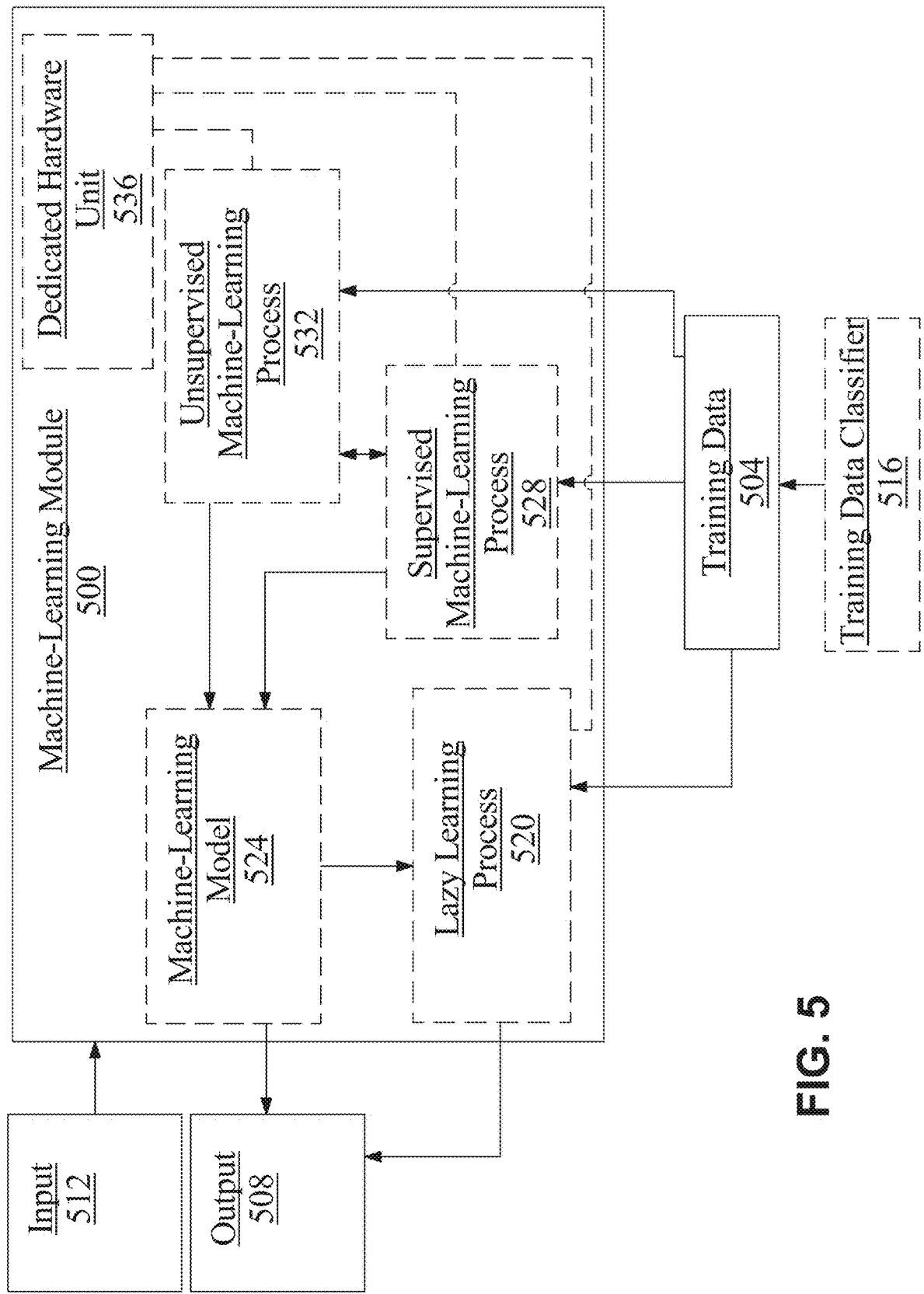
FIG. 5 is a block diagram of an exemplary machine-learning process.

Referring now to FIG. 5, an exemplary embodiment of a machine-learning module 500 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 504 to generate an algorithm instantiated in hardware or software logic, data structures, and/or functions that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example machine learning module 500 may receive input such as feedback from a robotic arm (i.e., tactile and/or visual, such as, without limitation effector pose and encoder information) and/or feedback from operation conditions (i.e., temperature changes, and the like) to learn how the feedback affects calibration of the robotic arm to generate outputs which may include, without limitation, adjusting calibration settings (i.e., control gains, kinematic parameters, and the like).

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 516 may classify elements of training data as groups or clusters of sensor readings that may correspond to different calibration states or operating conditions.

Still referring to FIG. 5, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm May include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 5, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 5, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 5, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 5, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 5, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 5, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 5, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 5, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 5, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 5, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include robotic arm feedback (tactile and visual), effector pose (position and orientation) from encoder data of a robotic arm, environmental changes (i.e., temperature) as described above as inputs, calibration setting adaptation as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

With further reference to FIG. 5, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 5, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 532 may not require a response variable; unsupervised processes 532 may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 5, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 5, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 5, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 5, one or more processes or algorithms described above may be performed by at least a dedicated hardware unit 536. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 536 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 536 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 536 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 6:
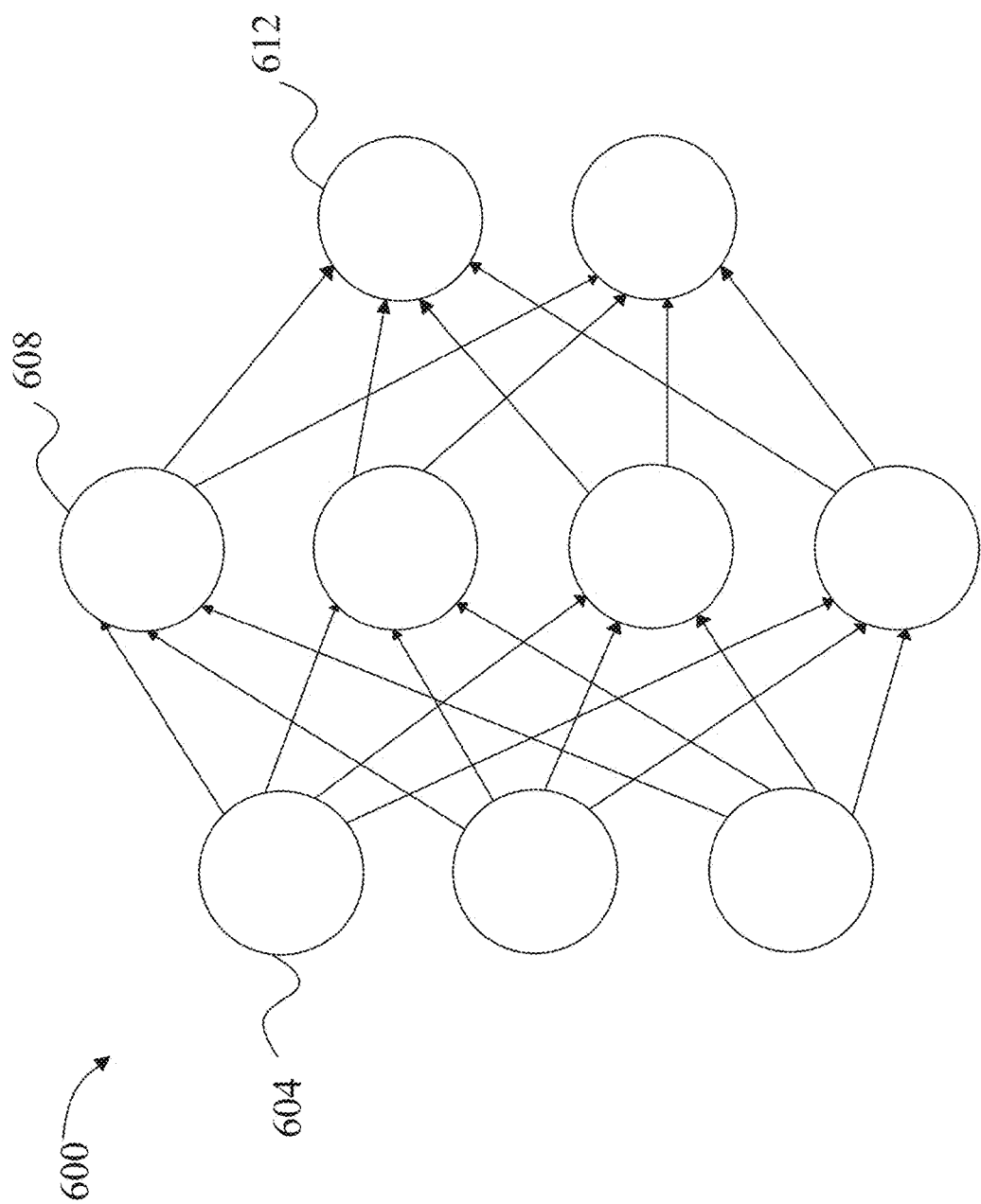
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
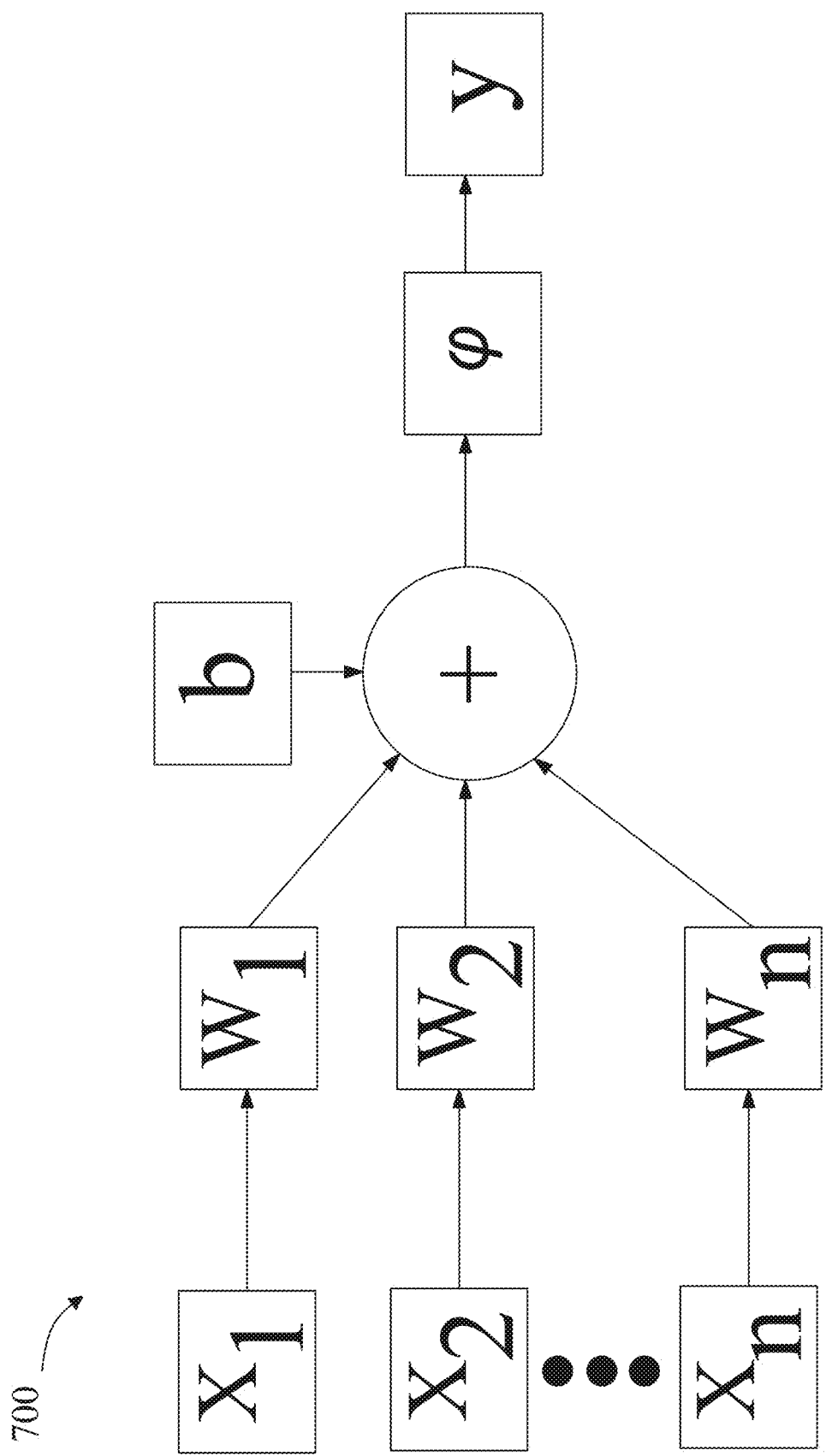
FIG. 7 is a diagram of an exemplary embodiment of a node of a neural network.

Referring now to FIG. 7, an exemplary embodiment of a node 700 of a neural network is illustrated. A node may include, without limitation, a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $$f(x) = a\left(1 + \tanh\left(\sqrt{2/\pi}\left(x + bx^r\right)\right)\right)$$

for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
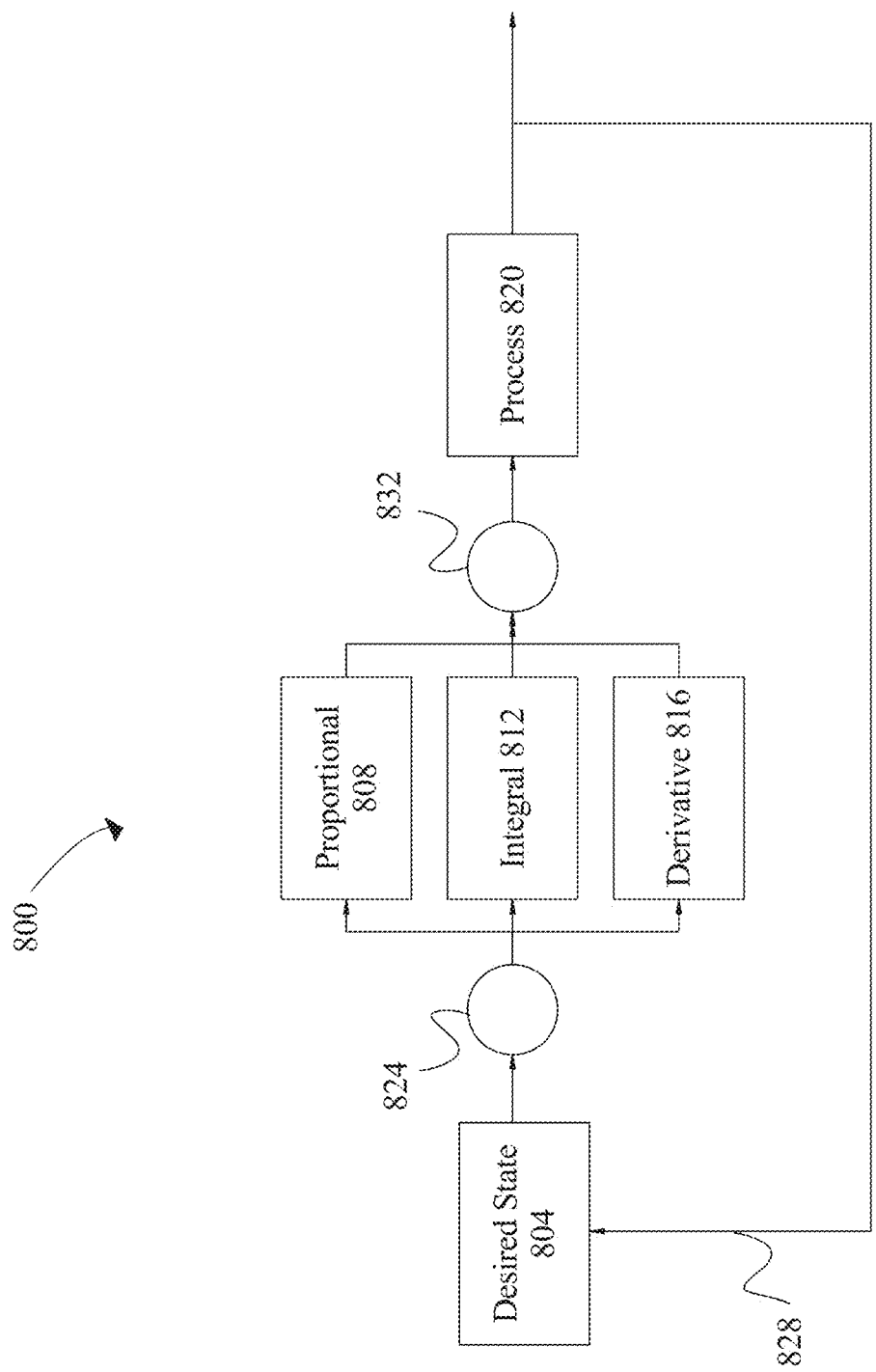
FIG. 8 is an exemplary embodiment of a control system.

Referring now to FIG. 8, an exemplary embodiment of a control system, 800. In an embodiment, control system 800 may include desired state 804 as an input to the control system. In a non-limiting embodiment, the control system 800 may include three control terms: proportional 808, integral 812, and derivative 816. In a non-limiting example, the control system 800 may be designed to continuously calculate an error value 824 as the difference between desired state 804 and process 820. In a non-limiting example, desired state 804 may be described by the formula: SP=r(t). In a non-limiting example, process 820 may be described by the formula: PV=y(t):e(t)=r(t)−y(t) where e(t) is the error value 824. In a non-limiting example, control system 800 may include operational amplifiers (op-amps) or digital differentiators and digital integrators. Without limitation, an op-amp is a high-gain electric voltage amplifier with differential inputs with, typically, a single-ended output. In a non-limiting example, op-amp may have a high input impedance and low output impedance, to effectively amplify a signal. Without limitation, control system 800 may include a digital differentiator. Without limitation, a digital differentiator is a device or algorithm that computes the derivative of a digital signal by calculating the rate at which a signal is changing over time. Without limitation, control system 800 may include a digital integrator. Without limitation, a digital integrator is an algorithm or device that computes the integral of a digital signal by accumulating the signal's value over time and integrates error signals in the control system 800 to reduce the steady-state error.

With continued reference to FIG. 8, in another non-limiting example, the control system 800 may attempt to minimize the error over time by adjusting control variable u(t) 832, such as opening a control valve, to a new value determined by a weighted sum of the control terms.

With continued reference to FIG. 8, in a non-limiting example, the control system 800 may include the term P, which is associated to the current value of the SP-PV error e(t). Continuing the previous example, without limitation, if the error is large, the control output will be proportionately large by using the gain factor "$K_p$". Continuing the previous example, without limitation, using proportional control alone may result in an error between the set point and the output value because the controller may require an error to generate the proportional output response. For example, without limitation, in steady state process conditions an equilibrium is reached, with a steady SP-PV "offset".

With continued reference to FIG. 8, in a non-limiting example, the control system 800 may include the term I which may account for past values of the SP-PV error and integrate them over time to produce the I term. In a non-limiting example, the I term is an integrator wherein the integrator accumulates the past error over time which is represented by the following formula: $K_i * \int_0^t e(\tau)d\tau$ where $K_i$ is the integral gain, $\int_0^t e(\tau)d\tau$ is the integral of the error from time 0 to t. Without limitation, the integral control helps eliminate the residual steady-state error that occurs with a pure proportional controller and ensures that the accumulated error over time is corrected to further drive process 820 to desired state 804. Without limitation, the integral function may integrate a signal. For example, if there is a residual SP-PV error after the application of proportional control, the integral term may seek to eliminate the residual error by adding a control effect due to the historic cumulative value of the error. Continuing the previous example, without limitation, when the error is eliminated, the integral term will cease to grow, which may result in the proportional effect diminishing as the error decreases, however this may be compensated for by the growing integral effect.

With continued reference to FIG. 8, in a non-limiting example, the control system 800 may include the term D which may be the best estimate of the future trend of the SP-PV error, based on its current rate of change. Continuing the previous example, without limitation, it may effectively seek to reduce the effect of the SP-PV error by exerting a control influence generated by the rate of error change. Continuing the previous example, without limitation, the more rapid the change, the greater the controlling or damping effect. In a non-limiting example, the derivative function predicts the future trend of the error based on its rate of change and thus applies a corrective action to reduce the error quickly. For example, and without limitation, the derivative function may be represented by the following equation:

$$K_d * \frac{de(t)}{dt}$$

where $K_d$ is the derivative gain and $$\frac{de(t)}{dt}$$

is the rate of change of error at time t. In a non-limiting example, the derivative function may take the derivative of a signal. With continued reference to FIG. 8, in a non-limiting example, feedback signal 828 is generated by process 820 and used as input into desired state 804. In a non-limited example, desired state 804 transmits error value 824 into PID controller and PID controller outputs control variable 832.

Figure 9:
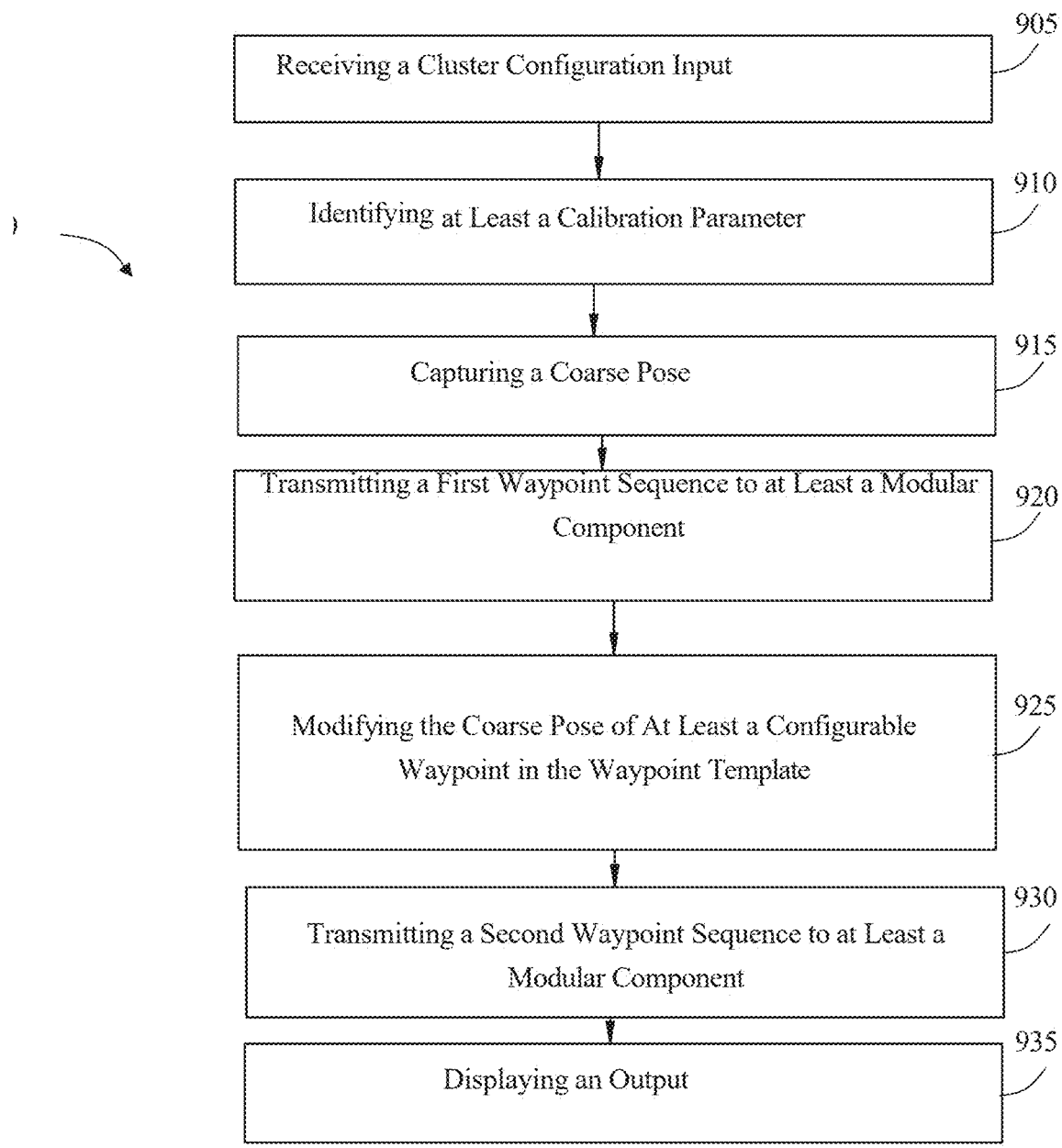
FIG. 9 is a block diagram of an exemplary method for automatic calibration of a robotic arm in a modular system.

Referring now to FIG. 9, a flow diagram of an exemplary method 900 for automatic calibration of a robotic arm in a modular system is illustrated. At step 905, method 900 includes receiving, using at least a processor, a cluster configuration input, wherein the cluster configuration input comprises information associated with at least a modular component arrangement. This may be implemented as described and with reference to FIGS. 1-8.

Still referring to FIG. 9, at step 910, method 800 includes identifying, using at least a processor, calibration parameters, as a function of the cluster configuration. This may be implemented as described and with reference to FIGS. 1-8.

Still referring to FIG. 9, at step 915, method 900 includes capturing, using at least a processor, a coarse pose of the one or more modular components. This may be implemented as described and with reference to FIGS. 1-8.

Still referring to FIG. 9, at step 920, method 900 includes transmitting, using at least a processor, a first waypoint sequence, wherein the first waypoint sequence is generated using the cluster configuration, a waypoint template, and a coarse pose. This may be implemented as described and with reference to FIGS. 1-8.

Still referring to FIG. 9, at step 925, method 900 includes modifying, using one or more control algorithms, the coarse pose of at least a configurable waypoint in the waypoint template, wherein modifying the coarse pose of the at least a configurable waypoint comprises:
receiving feedback associated with one or more modular components;
generating a refined pose, wherein the at least a configurable waypoint and the feedback to modify the coarse pose. This may be implemented as described and with reference to FIGS. 1-8.

Still referring to FIG. 9, at step 930, method 900 includes transmitting, using at least a processor, a second waypoint sequence, wherein the second waypoint sequence is generated using the cluster configuration, a waypoint template, and a refined pose. This may be implemented as described and with reference to FIGS. 1-8.

Still referring to FIG. 9, at step 935, method 900 includes displaying, using a display device, an output. This may be implemented as described and with reference to FIGS. 1-7. In an embodiment, wherein displaying the output using a display device may include a remote device, the apparatus, and/or shared devices.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
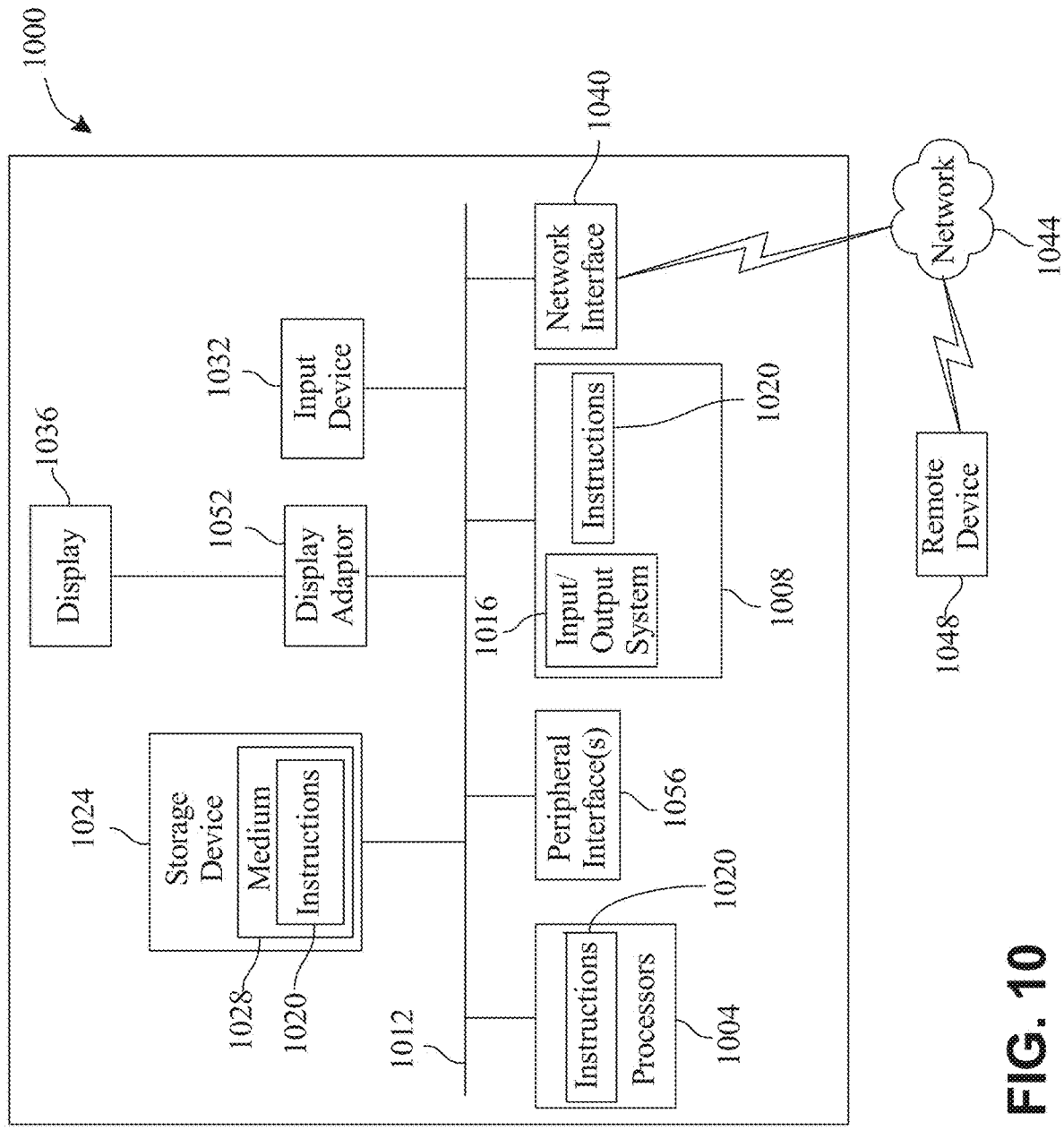
FIG. 10 is a block diagram of a computing system that can be used to implement any one or more of the methodologies disclosed herein and any one or more portions thereof.

FIG. 10 shows a diagrammatic representation of one embodiment of computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed:

1. An apparatus for automatic calibration of a robotic arm in a modular system, wherein the apparatus comprises:
   at least a cluster configuration, wherein the cluster configuration comprises at least a modular component;
   a computing device, wherein the computing device comprises:
      a memory, wherein the memory stores instructions; and
      a processor, communicatively connected to the memory, wherein the processor is configured to:
         receive a cluster configuration input, wherein the cluster configuration input comprises information associated with at least a modular component arrangement;
         identify at least a calibration parameter as a function of the cluster configuration;
         capture a coarse pose of one or more modular components, wherein the coarse pose includes a position of the robotic arm in a center of a space of the cluster configuration;
         transmit a first waypoint sequence to at least a modular component, wherein the first waypoint sequence is generated using the cluster configuration, a waypoint template, and the coarse pose;
         modify, using one or more control algorithms, the coarse pose of at least a configurable waypoint in the waypoint template, wherein the one or more control algorithms is a machine-learning model, wherein modifying the coarse pose comprises:
            receiving training data, wherein the training data correlates a plurality of modular component feedback data as an input to a plurality of calibration adjustment setting data as an output;
            training, iteratively, the machine-learning model using the training data, wherein training the machine-learning model includes retraining the machine-learning model with feedback from previous iterations of the machine-learning model; and
            modifying the coarse pose using the trained machine-learning model to generate a refined pose;
         transmit a second waypoint sequence to the at least a modular component, wherein the second waypoint sequence is generated using the cluster configuration, the waypoint template, and the refined pose, wherein the second waypoint sequence comprises a path of movement of the robotic arm to operate in the cluster configuration to transport a slide containing at least one biomedical specimen from a first location to a third location via a second location, wherein:
            the first location is a location of a first modular component comprising a pick basket from which the robotic arm retrieves the slide;
            the second location is a location operatively associated with a second modular component comprising an optical device for digitally scanning the biomedical specimen of the slide; and
            the third location is a location of a third modular component comprising a drop basket to which the robotic arm delivers the slide; and
         display, using a display device, an output.

2. The apparatus of claim 1, wherein the waypoint template comprises at least a fixed waypoint and the at least a configurable waypoint.

3. The apparatus of claim 2, wherein the at least a configurable waypoint is associated with the one or more modular components.

4. The apparatus of claim 1, wherein the feedback comprises visual feedback from a macro-imaging setup inside of the optical device and tactile feedback from the robotic arm.

5. The apparatus of claim 4, wherein the visual feedback is generated utilizing a 3D fiducial of the optical device.

6. The apparatus of claim 5, wherein the 3D fiducial is a calibration slide.

7. The apparatus of claim 1, wherein the one or more control algorithms includes a feedback control algorithm.

8. The apparatus of claim 7, wherein the feedback control algorithm refines the coarse pose using dimensions and positions extracted real-time from a calibration slide.

9. The apparatus of claim 1, wherein the output comprises a validation metric which includes a calibration parameter for the robotic arm positioning relative to the at least a modular component.

10. A method for automatic calibration of a robotic arm in a modular system, wherein the method comprises:
   receiving a cluster configuration input, using a computing device, wherein the cluster configuration input comprises information associated with at least a modular component arrangement;
   identifying at least a calibration parameter, using the computing device, as a function of the cluster configuration;
   capturing a coarse pose, using the computing device, of one or more modular components, wherein the coarse pose includes a position of the robotic arm in a center of a space of the cluster configuration;
   transmitting a first waypoint sequence to at least a modular component, wherein the first waypoint sequence is generated using the cluster configuration, a waypoint template, and the coarse pose;
   modifying, using one or more control algorithms, the coarse pose of at least a configurable waypoint in the waypoint template, wherein the one or more control algorithms is a machine-learning model, wherein modifying the coarse pose comprises:
      receiving training data, wherein the training data correlates a plurality of modular component feedback data as an input to a plurality of calibration adjustment setting data as an output;

training, iteratively, the machine-learning model using the training data, wherein training the machine-learning model includes retraining the machine-learning model with feedback from previous iterations of the machine-learning model; and modifying the coarse pose using the trained machine-learning model to generate a refined pose;

transmitting a second waypoint sequence to the at least a modular component, wherein the second waypoint sequence is generated using the cluster configuration, the waypoint template, and a refined pose, wherein the second waypoint sequence comprises a path of movement of the robotic arm to operate in the cluster configuration to transport a slide containing at least one biomedical specimen from a first location to a third location via a second location, wherein:

the first location is a location of a first modular component comprising a pick basket from which the robotic arm retrieves the slide;

the second location is a location operatively associated with a second modular component comprising an optical device for digitally scanning the biomedical specimen of the slide; and the third location is a location of a third modular component comprising a drop basket to which the robotic arm delivers the slide; and displaying, using a display device, an output.

11. The method of claim 10, wherein the waypoint template comprises at least a fixed waypoint and the at least a configurable waypoint.

12. The method of claim 11, wherein the at least a configurable waypoint is associated with the one or more modular components.

13. The method of claim 10, wherein the feedback comprises visual feedback from a macro-imaging setup inside of the optical device and tactile feedback from the robotic arm.

14. The method of claim 13, wherein the visual feedback is generated utilizing a 3D fiducial of the optical device.

15. The method of claim 14, wherein the 3D fiducial is a calibration slide.

16. The method of claim 10, wherein the one or more control algorithms includes a feedback control algorithm.

17. The method of claim 16, wherein the feedback control algorithm refines the coarse pose using dimensions and positions extracted real-time from a calibration slide.

18. The method of claim 10, wherein the output comprises a validation metric which includes a calibration parameter for the robotic arm positioning relative to the at least a modular component.

* * * * *